United States Patent [19]

Hoffman et al.

[11] Patent Number: 5,321,875
[45] Date of Patent: Jun. 21, 1994

[54] WELL BLOCK CENTERING TOOL

[75] Inventors: John P. Hoffman, Coopersburg; Alvin M. Nestler, Hellertown, both of Pa.; Donald J. Idstein, Valparaiso, Ind.

[73] Assignee: Bethlehem Steel Corporation, Bethlehem, Pa.

[21] Appl. No.: 81,031

[22] Filed: Jun. 22, 1993

[51] Int. Cl.⁵ .............................................. B65B 27/14
[52] U.S. Cl. ....................................... 29/271; 29/261; 29/263
[58] Field of Search ................. 29/261, 262, 263, 265, 29/271, 464

[56] References Cited

U.S. PATENT DOCUMENTS 2,341,677 2/1944 Wass ..................................... 29/265
4,050,136 9/1977 Shultz ................................... 29/263
4,429,447 2/1984 Davis ................................... 29/262

Primary Examiner—Robert C. Watson
Attorney, Agent, or Firm—Harold I. Masteller, Jr.

[57] ABSTRACT

A centering tool for coaxially aligning a well block with a discharge bore of a steelmaking vessel, the centering tool comprising a support frame and a cluster of pivotable centering arms. Each centering arm includes a wedge shaped portion having a first edge adapted to engage a drive means, and a second edge having a first surface adapted to engage the wall of a bore extending through the well block, and a second surface adapted to engage the wall of the discharge bore of the steelmaking vessel. The drive means includes an expansion plug for engaging and pivoting centering arms positioned within the bore of the well block.

10 Claims, 4 Drawing Sheets

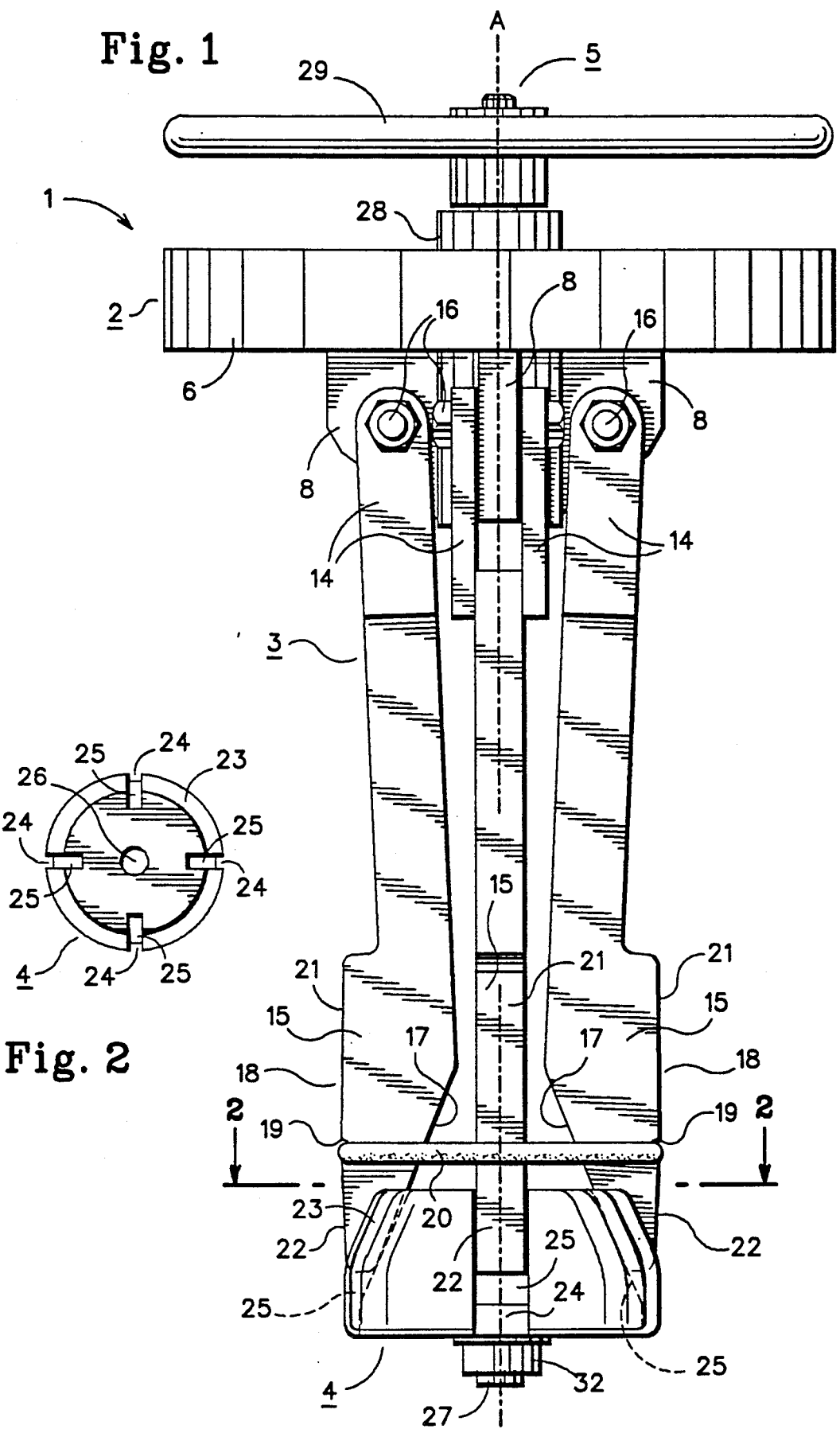

WELL BLOCK CENTERING TOOL

BACKGROUND OF THE INVENTION

This invention relates to the centering of well blocks in steelmaking vessels, and in particular, it relates to a well block centering tool for aligning well blocks within steelmaking vessels either during their initial construction or during the relining of the vessel. Steelmaking vessels, such as ladles, include discharge bores through which molten metal is discharged. The discharge bores are located within well areas which include an outer steel shell made up of a level plate and a mounting plate, and an inner refractory lining including a well block. The discharge bore extends through the level plate and mounting plate and is coaxially aligned with the centerline of the well area of the ladle. The mounting plate provides means for attaching a slide gate valve to control the flow of molten metal being discharged through the bore.

The well block also includes a discharge bore. This bore is adapted to receive a nozzle insert which is mortared in place within the well block. The nozzle insert extends downward through both the level and mounting plates and engages the mechanism of the slide gate.

Therefore, the well block must be accurately aligned with the centerline of the discharge bore in order to properly seat and align the various parts of the nozzle mechanism. It must also be held in place to insure that it doesn't move out of alignment during the relining of the vessel. This is difficult for workers to accomplish because placement of the well block within the well area obscures their view of the discharge bore located below the well block.

Failure to coaxially align the well block with the well area will cause premature failure of the nozzle parts. In the worse case scenario, the off-center well block can be misaligned to a point where no gap is provided for a mortar joint between a portion of the nozzle insert and the adjacent bore wall of the well block. This scenario also produces a much too large mortar joint between the opposite side of the nozzle insert and the well block bore.

Such substandard mortar joints usually contain voids or gaps which set up conditions whereby molten steel seeps between the nozzle insert and well block causing premature nozzle failure, damage to the slag sensors adjacent the discharge nozzle, and damage to the slide gate mechanism. In addition, the off-center well block can cause misalignment between the nozzle insert and slide gate valve mechanism resulting in unsatisfactory operation of the slide gate valve as the molten steel is discharged from the ladle.

SUMMARY OF THE INVENTION

It is therefore an object of this injection to provide a well block centering tool to coaxially align a well block with the centerline of a ladle well.

It is a further object of this invention to provide a well block centering tool which is capable of aligning a well block under conditions of poor visibility.

It is a still further object of this invention to provide a well block centering tool which aligns the bore of a well block to receive a nozzle insert and provide a uniform gap for a mortar joint between the nozzle insert and the bore surface.

It is a still further object of this invention to provide a well block centering tool which aligns a well block to properly position a nozzle insert for engagement with the mechanism of a slide gate valve.

And finally, it is an object of this invention to provide a well block centering tool which is simple to operate.

We have discovered that the foregoing objects can be attained with a well block centering tool having a support frame and a cluster of pivotable centering arms. Each centering arm includes a wedge shaped portion having a first sloped edge adapted to engage a drive means, a first tapered surface adapted to engage the wall of a bore extending through the well block, and a second tapered surface adapted to engage the wall of the discharge bore of the steelmaking vessel. The drive means includes a reciprocating rod having an expansion plug attached to one end. The expansion plug is positioned within the cluster of centering arms to cause the centering arms to pivot as the reciprocating rod moves the expansion plug in an upward or downward direction.

BRIEF DESCRIPTION OF THE DRAWINGS

FIG. 1 is an elevation view of the preferred well block centering tool.

FIG. 2 is a cross-sectional view taken along the lines 2—2 of FIG. 1.

DETAILED DESCRIPTION OF THE PREFERRED EMBODIMENT

Figure 3:
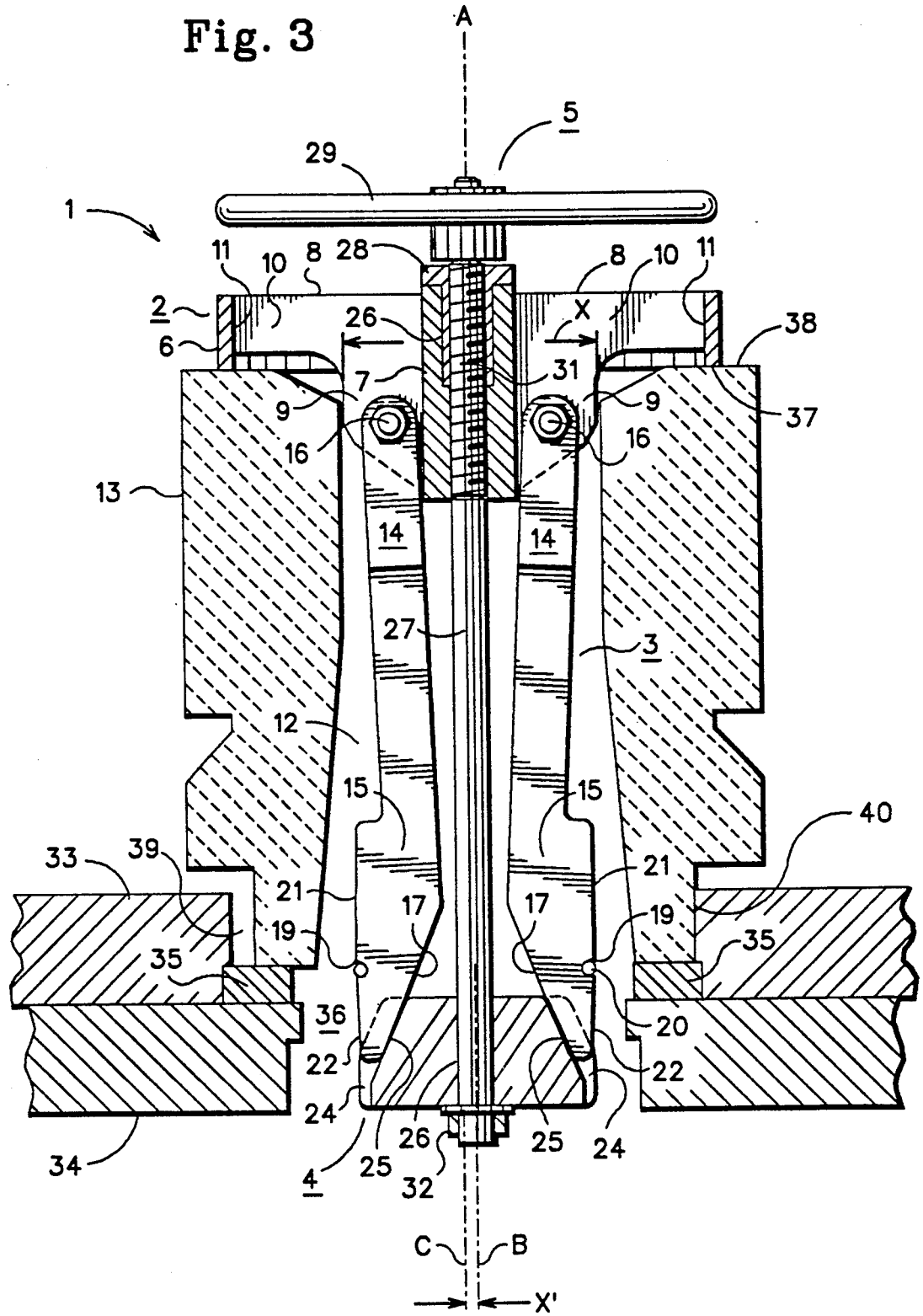
FIG. 3 is an elevation view showing the preferred well block centering tool placed within the bore of a well block.

Referring to FIGS. 1-3 of the drawings, a well block centering tool 1 is shown comprising a support frame 2, a cluster of support arms 3 pivotally attached to the support frame, an expansion plug 4 positioned within the cluster of centering arms, and a drive means 5 capable of moving the expansion plug in an upward or downward direction along the vertical centerline "A" of the well block centering tool.

The support frame comprises a spider assembly comprises having a peripheral member 6 encircling a central hub 7, and a plurality of spider plates 8. Each spider plate 8 comprises an angle shape configuration having a horizontal leg portion 10 extending between hub 7 and the inside surface 11 of peripheral member 6, and a downward extending leg portion 9 adjacent hub 7. The downward extending leg portions 9 are proportioned to fit within bore 12 of well block 13, and as shown in FIG. 3, distance "X", measured across opposed downward legs 9, is only slightly less than the inside diameter of bore 12.

Each spider plate 8 further includes an aperture for pivotally attaching a centering arm 3. The pivotal centering arms include an upper clevis portion 14 and a low wedge shaped end 15. Each clevis includes spaced apart arms placed to expand along opposite sides of the spider plate 8, and the clevis is pivotally attached to the spider plate by means of a pin or bolt 16 inserted through the apertures provided within the spider plates.

Each wedge shaped end 15 includes a first sloped edge 17 for engaging expansion plug 4, and a second sloped edge 18 having a double tapered surface for engaging the bore surfaces of both the well block and ladle shell. The first sloped edge extends in a downward direction toward centerline "A" and engages a slot 24 provided in expansion plug 4. The second sloped edge includes a notch or groove 19 for receiving an expandable retainer 20 such as an elastomer o-ring as shown in the drawing. Groove 19 is positioned along the second sloped edge and the first tapered surface 21 extends from notch 19 in an upward direction toward centerline "A". The second tapered surface 22 extends from notch 19 in a downward direction toward the centerline "A", and the first and second tapered surfaces intersect each other at an angle $\theta$ as shown in FIG. 5.

As shown more clearly in FIG. 2, expansion plug 4 comprises a cylindrical component having an upper tapered portion 23 and a plurality of slots 24, each slot having an inclined surface 25 corresponding to the first sloped edge 17. Expansion plug 4 further includes an aperture 26 for receiving a rod 27 extending downward from the expansion plug drive means 5.

Figure 4:
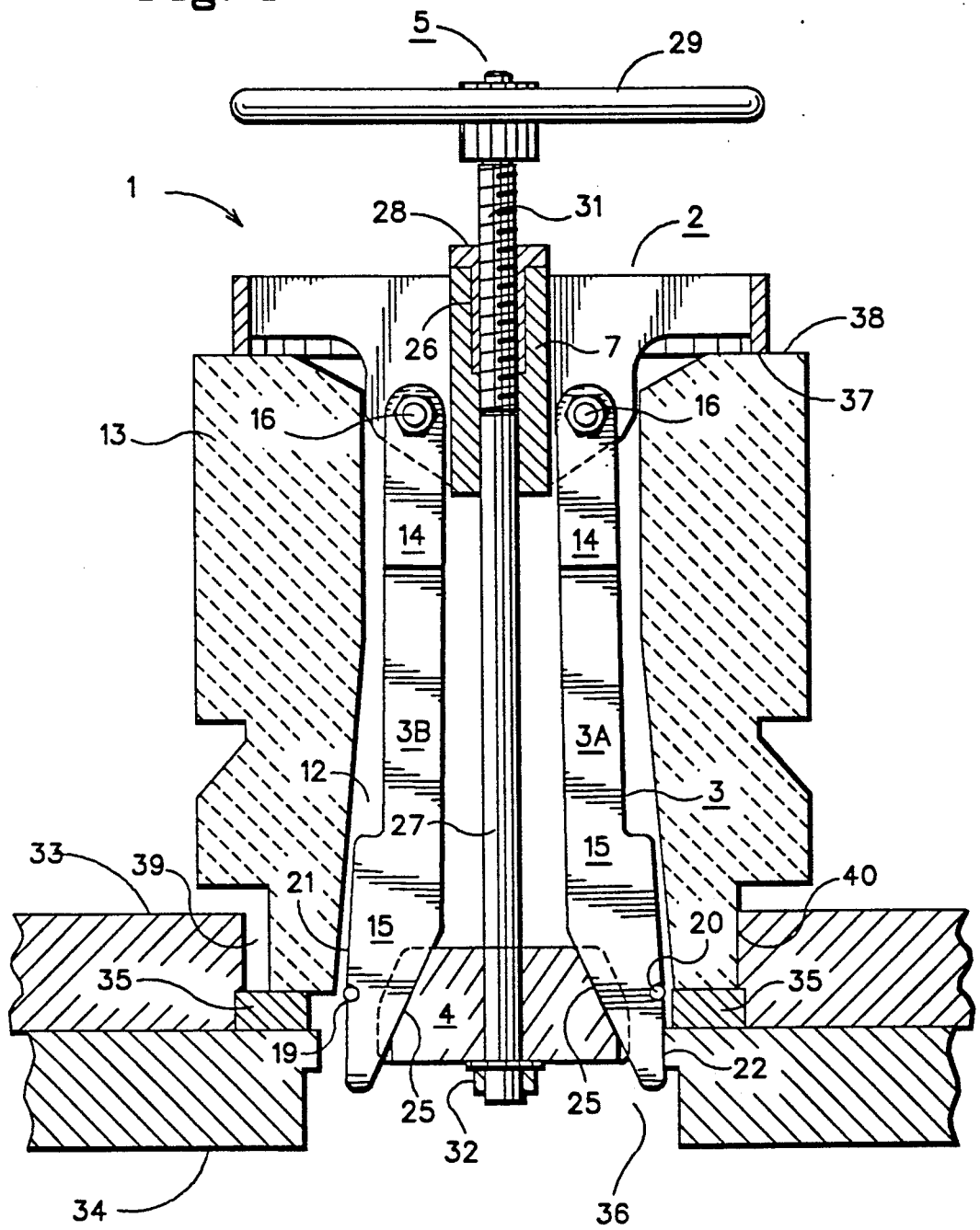
FIG. 4 is a view similar to FIG. 3 showing the well block centering tool partially expanded.
Figure 5:
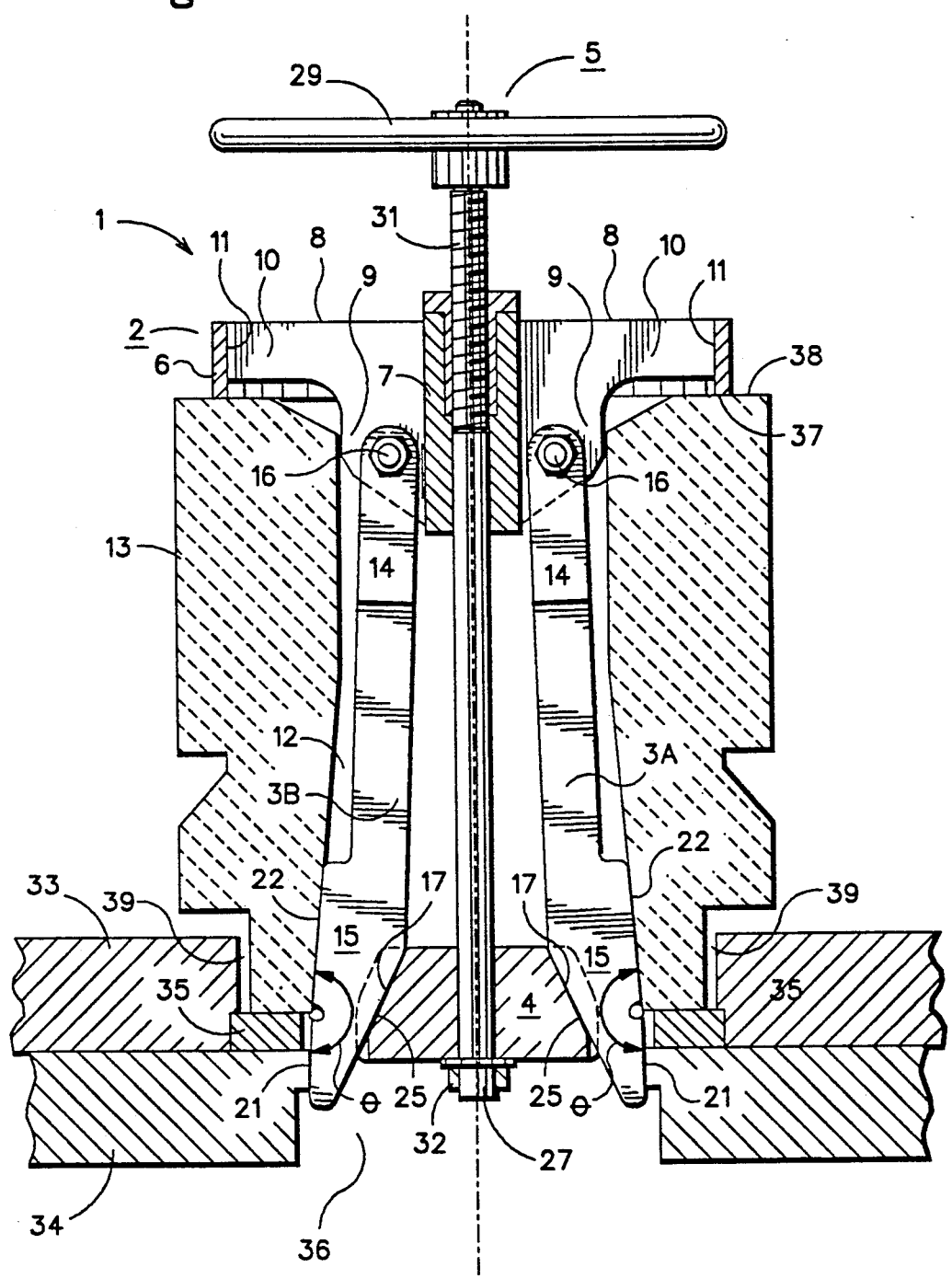
FIG. 5 is a view similar to FIG. 3 showing the well block tool fully expanded and the well block properly centered.

The expansion plug drive means, more clearly shown in FIGS. 3-5, comprises a rod 27, a bushing 28, and a handwheel or handle 29. Bushing 28 is fitted within the enlarged portion of a countersunk hole 26 extending through hub 7 of the spider assembly, and the bushing includes a threaded bore for engaging a threaded portion 31 of rod 27. One end of rod 27 is attached to the handwheel 29, and the opposite end of the rod extends through aperture 26 of the expansion plug and is attached thereto by fastening means 32.

The procedure for centering a well block within the well area of a ladle is illustrated in FIGS. 3-5 and described below.

The well area of a steelmaking ladle includes a steel shell comprising a level plate 33, a mounting plate 34 to which a slide gate valve is attached, and electromagnetic slag detector 35 positioned to encircle the discharge opening 36 extending through both the level and mounting plates. When a well block 13 is placed within the well area of the ladle, the well block conceals the discharge bore. This is troublesome for workers attempting to center the well block within the well area of the ladle. As a result, well block centerline "B" is often out of alignment with centerline "C" of the discharge opening 36 by a given distance X'. As shown in FIG. 3, misalignment of well block 13 fails to provide a uniform mortar gap 39 between the well block and discharge bore 36, and in extreme cases, a portion of well block 13 abuts the sidewall of the discharge bore providing no mortar gap as shown at reference number 40. Such misalignment between the well block and discharge bore 36 causes premature nozzle failures as described above.

In order to properly align the well block within the well area of the vessel, the well block centering tool 1 is inserted into bore 12 of the well block. The bottom surface 37, of the centering tool's support frame 2 rests upon the top surface 38 of the well block, and the cluster of pivotal support arms 3 extend from the support frame in a downward direction into the discharge bore 36. Wedge ends 15 are arranged to position their first tapered surfaces 21 adjacent bore 12 of the well block and their second tapered surfaces 22 adjacent the discharge bore 36 extending through the ladle shell. Handwheel 29 is then rotated to pull expansion plug 4 in an upward direction toward bore 12. As the expansion plug is drawn into the bore, the inclined surfaces 25 of the expansion plug slots engage and slide along the first sloped edges 17 of the centering arms, forcing the wedge portions 15 in an outward direction away from centerline "A".

Referring now to FIGS. 4 and 5, continued rotation of handwheel 29 draws the expansion plug upward into bore 12 of the well block until one or more second tapered surfaces 22 of support arms 3A engage the wall surface of discharge bore 36, and the first tapered surfaces 21 of the remaining support arms 3B engage the wall surface of bore 12 extending through the well block.

As expansion plug 4 continues to be drawn deeper into bore 12, support arms 3A are restrained from further outward movement by the steel shell. This causes support arms 3B to exert an opposite force against the well block and the well block is pushed in a horizontal direction until it is coaxially aligned with discharge bore 36 as shown in FIG. 5.

After well block 13 is properly aligned and positioned within the well area of the ladle, workers can install the refractory lining of the vessel. Once the well block is held securely in place by surrounding refractory lining materials, the centering tool 1 can be removed from the well block. This is accomplished by rotating handwheel 29 in the opposite direction to drive expansion plug 4 in a downward direction away from the well block. As expansion plug 4 moves downward, the expanded retaining ring contracts thereby disengaging the wedge ends 15 from the bore surfaces, and the centering tool is removed from the well block.

While this invention has been illustrated and described in accordance with a preferred embodiment, it is recognized that variations and changes may be made therein without departing from the scope of the invention as set forth in the claims.

We claim:

1. A centering tool for coaxially aligning a well block within a discharge bore of a steelmaking vessel, the centering tool comprising:
   a) a frame including a plurality of spider plates radially spaced about a hub, said hub including a bore extending therethrough,
   b) a cluster of centering arms, each said centering arm having a first end pivotally attached to a said spider plate and a second end having a wedge shaped portion, each wedge shaped portion including a first edge adapted to engage an expansion plug and a second edge having a first and second surface opposite said first edge, said first surface being adapted to apply a lateral force against the wall of a bore extending through said well block, and said second surface being adapted to apply a lateral force against the wall of said discharge bore of said steelmaking vessel, and
   c) a drive means having one end extending in an outward direction from said frame to provide means for pivoting said centering arms positioned within the bore of said well block located within said discharge bore, said drive means capable of pivoting said centering arms to cause the first surface of each said wedge shaped portion to exert said lateral force against said well block bore and to cause the second surface of each said wedge shaped portion to exert said lateral force against said discharge bore.

2. The invention recited in claim 1 wherein the plane of said first surface and the plane of said second surface are not parallel.

3. The invention recited in claim 1 wherein said drive means includes a rod extending through said bore of said hub, said rod having one end extending in an outward direction from said frame and an opposite end attached to said expansion plug, said rod providing means to move said expansion plug in a longitudinal direction to engage said expansion plug with said first edge of the wedge shaped portions of said centering arms, said longitudinal movement causing said centering arms to pivot within said well block bore and said discharge bore.

4. The invention recited in claim 3 wherein said expansion plug includes a plurality of grooves, each groove adapted to receive a said web shaped portion of a said centering arm.

5. The invention recited in claim 4 wherein each said groove includes an inclined surface to engage the first surface of a said wedge shaped portion of a said centering arm.

6. The invention recited in claim 1 wherein an expandable retainer encircles said wedge shaped portions of said cluster of centering arms, said expandable retainer applying a force to pivot said centering arms in a direction away from said well block bore.

7. The invention recited in claim 2 wherein said first surface and said second surface intersect at an angle $\theta$, said angle $\theta$ corresponding to an angle of intersection between said well block bore and said discharge bore.

8. The invention recited in claim 1 wherein said rod of said drive means is threaded, and said bore of said hub of said frame is threaded.

9. The invention recited in claim 1 wherein said steelmaking vessel is a ladle.

10. The invention recited in claim 1 wherein said cluster of centering arms comprises at least three or more centering arms.

* * * * *